US008583598B2

(12) United States Patent
Shaull et al.

(10) Patent No.: US 8,583,598 B2
(45) Date of Patent: Nov. 12, 2013

(54) DEVICE AND METHOD FOR ENABLING LONG-LIVED SNAPSHOTS

(75) Inventors: Ross Shaull, Chelmsford, MA (US); Liuba Shrira, Brookline, MA (US); Hao Xu, Lexington, MA (US)

(73) Assignee: Brandeis University, Waltham, MA (US)

( * ) Notice: Subject to any disclaimer, the term of this patent is extended or adjusted under 35 U.S.C. 154(b) by 472 days.

(21) Appl. No.: 12/601,948

(22) PCT Filed: May 29, 2008

(86) PCT No.: PCT/US2008/006763
§ 371 (c)(1),
(2), (4) Date: May 25, 2010

(87) PCT Pub. No.: WO2008/150413
PCT Pub. Date: Dec. 11, 2008

(65) Prior Publication Data
US 2010/0241614 A1    Sep. 23, 2010

Related U.S. Application Data

(60) Provisional application No. 60/924,722, filed on May 29, 2007.

(51) Int. Cl.
*G06F 7/00* (2006.01)
*G06F 17/00* (2006.01)
(52) U.S. Cl.
USPC ............................ 707/639; 707/649; 707/651

(58) Field of Classification Search
USPC ......... 707/639, 644, 649, 651, 676, 677, 682, 707/685
See application file for complete search history.

(56) References Cited

U.S. PATENT DOCUMENTS

| | | | |
|---|---|---|---|
| 6,625,623 B1 | 9/2003 | Midgley et al. | |
| 6,959,313 B2 * | 10/2005 | Kapoor et al. | 707/649 |
| 2002/0083037 A1 * | 6/2002 | Lewis et al. | 707/1 |
| 2005/0010635 A1 | 1/2005 | Schwesig et al. | |
| 2005/0065986 A1 * | 3/2005 | Bixby et al. | 707/204 |
| 2005/0182953 A1 * | 8/2005 | Stager et al. | 713/189 |
| 2005/0193272 A1 * | 9/2005 | Stager et al. | 714/42 |
| 2008/0256311 A1 * | 10/2008 | Lee | 711/162 |

* cited by examiner

*Primary Examiner* — James E Richardson
(74) *Attorney, Agent, or Firm* — Pearl Cohen Zedek Latzer Baratz, LLP; Mark S. Cohen

(57) ABSTRACT

Decreasing disk costs make it possible to take frequent snapshots of past storage system states and retain them for a long duration. Existing snapshot approaches offer no satisfactory solution to long-lived snapshots. Split snapshots are an approach that is promising because it does not disrupt the current state storage system in either the short or the long run. An unsolved problem has been how to maintain an efficient access method for long-lived split snapshots without imposing undesirable overhead on the storage system. Skippy is a new approach that inexpensively indexes long-lived snapshots in parallel with snapshot creation. An embodiment of Skippy uses append-only index data structures to optimize writes while simultaneously providing low-latency snapshot lookup. Performance evaluations of Skippy indicate that this new approach is effective and efficient. It provides close-to-optimal access to long-lived snapshots while incurring a minimal impact on the current-state storage system.

7 Claims, 7 Drawing Sheets

$COST_{construction}(h)$

DEVICE AND METHOD FOR ENABLING LONG-LIVED SNAPSHOTS

CROSS REFERENCE TO RELATED APPLICATIONS

This is a national phase application of PCT international application PCT/US08/06763, filed May 29, 2008, that claims priority to U.S. provisional patent application 60/924,722, filed May 29, 2007, which is incorporated by reference herein in its entirety.

GOVERNMENT INTEREST

The work described herein was supported, in part, by a grant from the National Science Foundation, grant number NSF ITR 0427408. The United States government may have certain rights in the invention.

FIELD OF THE INVENTION

The present invention relates to an access method for a split snapshot storage system. More specifically, the present invention relates to an access method for a split snapshot storage system that enables efficient snapshot page table construction for long-lived snapshots.

BACKGROUND OF THE INVENTION

Decreasing disk costs make it possible to take frequent snapshots of past storage system states and retain them on-line for a long duration. A new generation of snapshot-based applications that use the past to infer about the current state and to predict the future is rushing to the market. Snapshot systems are attracting the attention of storage systems practitioners and researchers alike, and snapshots are becoming a "must have" for a modern storage system. Existing snapshot approaches, however, offer no satisfactory solution to long-lived snapshots. Yet, long-lived snapshots are important because, if the past is any predictor of the future, a longer-time prediction needs a longer-lived past.

Existing access techniques to versioned past data in databases and file systems rely on a "no-overwrite" update approach. In this approach, the past state remains in-place and the new state is copied, so the mappings for the past state take over the mappings of the current state all at once, rather than gradually. For example, consider a storage system which has only five pages P1, P2, P3, P4, and P5. The database maintains the current state of P1-P5. If after a snapshot is declared page P3 is modified to page P3', page P3 is left in place and page P3' is copied to a later point in the database. Thus, the database may contain pages P1, P2, P3, P4, P5, and P3'. Although the past state is maintained "as is", the current state becomes increasingly fragmented as page changes occur.

Split snapshot systems are a recent approach that is promising because, unlike other approaches, it does not disrupt the current state storage system in either short or long run, and because it allows garbage collecting of selected unneeded snapshots at no-cost, which is a useful feature for long-lived snapshots. An unsolved problem has been how to maintain an efficient access method for long-lived split snapshots without imposing undesirable overhead on the current storage system.

The problem arises because, to avoid disrupting the current state, the split snapshot system separates the past state from the current state, storing them separately. The current state is maintained in the database. Once a snapshot is declared, it is necessary to ensure that the declared snapshot accurately reflects the current state at declaration. In a split snapshot system, when pages are modified after a snapshot declaration, the unmodified page is copied to a separate storage system prior to modification and then the page in the database is modified "in place". For example, consider a storage system which has only five pages P1, P2, P3, P4, and P5. The database maintains the current state of P1-P5. If after a snapshot is declared page P3 is modified to page P3', page P3 is first copied to the separate storage system. Then the database is updated to reflect this change and now contains pages P1, P2, P3', P4, and P5.

This greatly simplifies and speeds up access to the current state since the current state is maintained "as is". However, access to past states is complicated by the fact that a snapshot's pages may be located in both the database and the separate storage system due to the fact that pages are only copied to the separate storage when they are modified. In the example above, the page table for the declared snapshot would need to indicate that pages P1, P2, P4, and P5 are in the database (since they haven't yet changed since the snapshot's declaration) while page P3 is in the separate storage (since it has changed after the snapshot's declaration). Since the snapshot page table is as large as the database page table (since they contain the same number of pages), when snapshots are frequent, managing such mutable snapshot page tables can be costly.

A "page" is defined as a virtual data block. A "mapping" is a data structure that provides a linkage from the logical/virtual address space of a page to the physical address space of a storage medium such as a hard disk drive or the like. A "snapshot mapping" is a mapping between a snapshot page and a snapshot storage. A "database mapping" is a mapping between a database page and a database storage. A "page table" is a data structure which contains mappings. Snapshot Page Tables (SPT) is a type of page table that can be created at low-cost by first writing the mappings of the snapshot pages into a sequential log as snapshot pages are copied to the snapshot store. The snapshot page table may then be constructed by scanning the log to find all the mappings for the snapshot pages. This can be costly if some pages are modified infrequently, since the scan has to pass over many repeated mappings of the frequently modified pages before finding the infrequent mappings.

Skewed update workloads are common in databases and file systems. The application requesting to run on a snapshot has to wait for the construction of the snapshot page table to complete. It is important, therefore, to reduce the time of the construction scan. Although in-memory techniques exist for split snapshot system to accelerate the construction scan, this approach supports only short-lived snapshots. Thus, an access method is needed for split snapshot systems that also supports long-lived snapshots.

SUMMARY OF THE INVENTION

In one embodiment of the invention provided herein, a computer readable medium may have a data structure. The data structure may include a log for storing snapshot mappings, wherein the mappings are stored in the log when a page of a snapshot is copied from a database storage to a snapshot storage, and wherein at least one of the mappings is a first mapping retained for the snapshot. The data structure may further include a plurality of partitioned levels for storing the snapshot mappings having a first level and at least one subsequent level, wherein partitions of the first level are populated by the mappings of the log, and wherein partitions of each of the at least one subsequent level are populated by copies of the first encountered mappings from partitions of a previous level, and wherein a last mapping of a partition is linked to a first mapping of a subsequent partition of the same level, and, additionally, wherein a last mapping of a partition not of the last level is linked to a mapping in a subsequent level which immediately follows the last of said copies of first encountered mappings of said partition not of the last level. The data structure may further include a table for locating within the first level the first mapping retained for each snapshot.

In another embodiment of the invention provided herein, a method for locating a snapshot mapping of a snapshot may include a step (a) of locating the first mapping retained for a snapshot within the first of a plurality of partitioned levels, wherein the levels are adapted for storing snapshot mappings of the snapshot, and wherein the mappings are stored when a page of the snapshot is copied from a database storage to a snapshot storage, and wherein at least one of the mappings is the first mapping retained for the snapshot, and wherein partitions of a first level are populated by the mappings from the log, and wherein partitions of a subsequent level are populated by copies of the first encountered mapping from partitions of a previous level, and wherein a last mapping of a partition is linked to a first mapping of a subsequent partition of the same level, and, additionally, wherein a last mapping of a partition not of the last level is linked to a mapping in a subsequent level which immediately follows the last of the copies of first encountered mappings of said partition not of the last level. The method may further include a step (b) of setting a current mapping to said first snapshot mapping in the first level. The method may further include a step (c) of setting a current mapping to the next mapping in a current partition if a current mapping is not the needed snapshot page mapping and a current mapping is not the last mapping of said current partition. The method may further include a step (d) of repeating step (c) until the current mapping is the last mapping of the current partition, if the current mapping is not the needed snapshot page mapping. The method may further include a step (e) of setting the current mapping to a mapping linked to in a subsequent level by the current mapping if the current mapping is a last mapping of a partition and the current mapping is in a partition not of the last level. The method may further include a step (f) of setting the current mapping to a mapping in the last level linked to by the current mapping if the current mapping is a last mapping of a partition of the last level. The method may further include a step (g) of setting the current partition to a partition containing the current mapping linked to by the last mapping. The method may further include a step (h) of repeating steps (c)-(g) until the needed snapshot page mapping is located.

BRIEF DESCRIPTION OF THE DRAWINGS

Embodiments of the invention will be understood and appreciated more fully from the following detailed description in conjunction with the drawings in which like reference numerals indicate corresponding, analogous or similar elements, and in which.

DETAILED DESCRIPTION OF THE INVENTION

Figure 1:
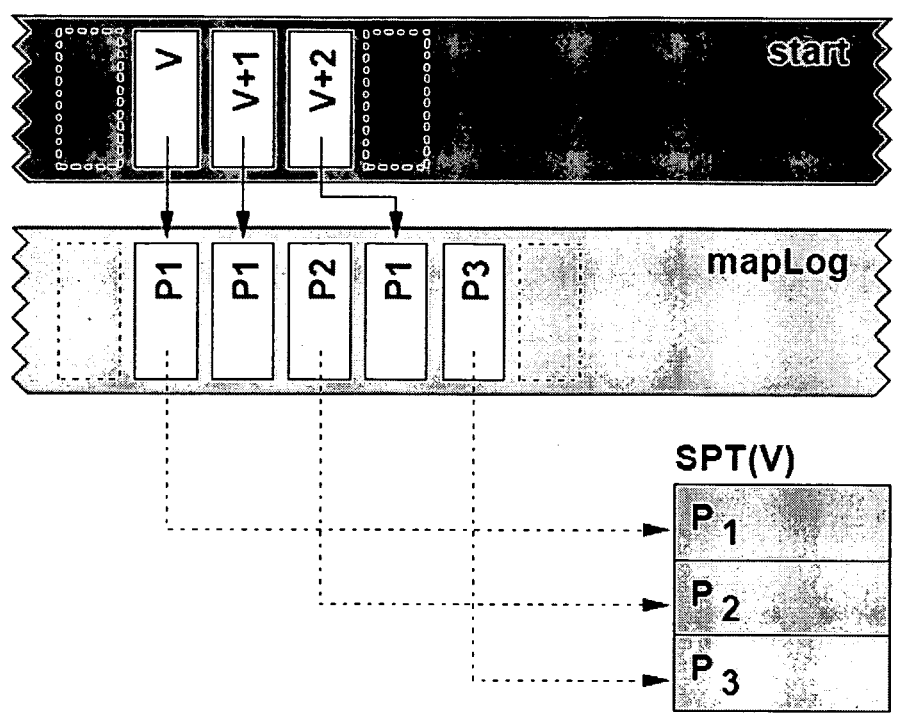
FIG. 1 shows a fragment of a mapLog and the constructed page table for a snapshot v in an embodiment of the invention.

In an embodiment of the invention, "Skippy", as the inventive method and system are herein referred to, is a simple new approach that may accelerate snapshot page table construction for long-lived snapshots, using a persistent data-structure that allows the scan to "skip" the unneeded repeated mappings. Skippy may also accelerate on-demand lookup of selected snapshot pages, without constructing a complete snapshot page table, thus providing a potential benefit to applications that access few snapshot pages. Importantly, the new approach may have low overhead.

In addition to back-in-time execution of programs "within" a snapshot (BITE), Skippy supports efficient "across time" execution (ATE) of programs written in the Map-Reduce style. Given a range of snapshots, an ATE program runs BITE over each snapshot, applying the Map function, and composes the results, applying the Reduce function. Using Skippy, a database application can run on-line over arbitrarily old snapshots, and iterate over snapshot windows, as efficiently as it can access recent snapshots, for any database update workload.

Running BITE on a snapshot resembles an "as-of" query in a transaction time database, running ATE over a range of snapshots resembles a computation of a SQL aggregate over a past data stream. By accelerating BITE and ATE over snapshots, Skippy serves a similar purpose to a multiversion access method that indexes logical records, albeit at a different level in the DBMS software stack, and using a radically different method based on scanning mappings to construct a page table, instead of searching and ordered set at each access. Nevertheless, like state-of-the-art methods for as-of queries, Skippy guarantees that access to a snapshot remains efficient independent of snapshot age and update workload.

Theoretical analysis, assuming a tractable page update workload model, and the measurements of the two Skippy prototypes, one in SNAP split snapshot system, using a standard application-level OO7 benchmark, another in Berkeley DB-based split snapshot system, using a controllable updated workload, indicate that Skippy may be effective and efficient, providing tunable, close to optimal, snapshot page table construction latency even for skewed workloads, at a minimal performance cost to the storage system.

Split Snapshots

A split snapshot system may separate the current state and the past state storage, to avoid the disruption of the current state in the long term. The system may have two storage components, a database and a snapshot store (snapStore), residing on separate disks for best performance. Database storage may include a set disk pages P1, P2, ..., Pk, and a page table that maps the pages into their disk locations. The database may be accessed by the application transactions that modify the database pages.

An application takes a snapshot by issuing a snapshot "declaration request". The system may serialize the snapshot in transaction order, returning to the application a "snapshot name". For simplicity, it is assumed that snapshots are named in an increasing integer sequence order. Snapshots may be "consistent", i.e., a snapshot v reflects all the modifications committed by the transactions that precede the declaration of v, and none of the modifications committed by the transactions that follow the declaration of v.

The snapshot system may virtualize database storage, adding a layer of indirection between the physical address of disk pages and the database paging architecture, similar to shadow tables. A snapshot may consist of a set of "snapshot pages" and a "snapshot page table" that maps snapshot pages to their disk locations. A snapshot may be accessed by mounting its page table, which maps each page either to the database or the archive. The indirection layer may be bypassed for operations executed against the current database to avoid overhead in operations that do not need snapshots.

Virtualizing database storage may enable efficient Back-In-Time Execution (BITE), a storage system capability where programs running application code can run against consistent snapshots, transparently paging snapshot pages the same way as database pages.

The snapshot creation process may work as follows. At the point of snapshot v declaration, the entire state of the snapshot v may reside in the database. This snapshot state may be copied into the snapStore, as it is being overwritten by modifications committed after the declaration of snapshot v. The split snapshot system may copy the snapshot state using a specialized deferred copy-on-write mechanism that accompanies the deferred database update. The copy-on-write mechanism may capture the pre-state of a page P in memory just before an update overwrites it for the first time after the declaration of snapshot v. The mechanism may defer the copying of the captured pre-states into the snapStore until the time when the buffer manager writes the corresponding updates to the database disk. The deferred copy-on write mechanism may preserve the efficiency of database writes, and avoids the short term disruption of the database, resulting from synchronous database updates caused by snapshots in many systems.

The Snapshot Access Method

The "Mapper" is the snapshot system component responsible for the location of the snapshot pages. The Mapper manages the snapshot page tables, providing two functions, snapshot page table creation and snapshot page lookup. The snapshot page tables may be large and their volume can grow fast when snapshots are frequent. Moreover, in a split snapshot system the mapping for a page P in the snapshot v page table may not be fixed. The mapping may change when the state of page P that corresponds to snapshot v gets copied from the database into snapStore at some point after snapshot v declaration as a result of an update to page P (see below for a detailed example). To avoid the cost of random disk i/o for in-place updates to snapshot page tables, the Mapper create function may create snapshot page tables, and update them, by writing snapshot mappings into a log-structured write-optimized persistent data-structure called the mapLog when snapshot pages are copied into the snapStore. The Mapper lookup function may search the mapLog for the mappings of the requested snapshot pages.

The Mapper protocols for writing and lookup of the snapshot mappings interact as follows. Consider a pre-state of a page, corresponding to the first modification to a page committed after the declaration of snapshot v and before the declaration of snapshot v+1. This pre-state may belong to snapshot v. Call such pre-states "pages retained for snapshot v". As the snapshot system copies the pages retained for snapshot v into the snapshot store, the Mapper may write the snapshot mappings for these pages into the mapLog.

Without constraining the snapshot page copying order, the mapLog writing protocol may enforce the following invariant:

$I_{mapLog}$: all the mappings for pages retained for snapshot v are written before all the mappings for pages retained for snapshot v+1.

The Mapper lookup protocol may rely on the invariant $I_{mapLog}$ when searching for the mappings. Let start(v) be a data structure (such as a table) that contains the first mapping in the mapLog for a page retained for a snapshot v. In other words, start(v) takes a snapshot v as an input and provides the location in the mapLog of the first mapping retained by v. Thus, the start data structure is as large as the number of snapshots. The Mapper may locate a mapping for a page P in snapshot v by sequentially scanning the mapLog from the position provided by start(v) onward, returning the first mapping it encounters for a page P. Invariant $I_{mapLog}$ guarantees that the First Encountered Mapping (referred to as FEM, for short) corresponds to the page pre-state that was captured when the page P was modified for the first time after the snapshot v declaration, and is, therefore, the correct required mapping.

FIG. 1 illustrates the result of running an embodiment of the Mapper lookup protocol. FIG. 1 depicts a mapLog fragment containing the result of running three transaction histories, T1, T2, and T3, in a database containing three pages, P1, P2, and P3. T1 declares snapshot v and modifies P1, resulting in a mapping for P1 being retained for v in mapLog. In other words, a mapping for the pre-state of P1 is copied into mapLog. Since this is the first time the page has been modified after a snapshot declaration (in this case v), it is said that the pre-state for this page is retained for v. T2 declares snapshot v+1 and modifies P1 and P2. Snapshot v needs the mapping for P2 retained for v+1 because it corresponds to the pre-state that was in the database at the time v was declared. T3 declares snapshot v+2 and modifies P1 and P3. v also needs the mapping for P3 retained for v+2 because it corresponds to the pre-state that was in the database at the time v was declared. In order to construct the Snapshot Page Table (SPT) for v, SPT(v), the Mapper lookup protocol begins with the first mapping retained for v, which is pointed to by start (v), and copies each FEM from mapLog into SPT(v).

The Mapper lookup protocol may be guaranteed to find all the mappings for a given snapshot provided the entire snapshot state has been copied into the snapshot store. The condition may hold if the entire database state has been overwritten since the snapshot declaration. In a long-lived snapshot system, this condition may hold for all the snapshots older than some given threshold that advances with time. The discussion below considers only such older snapshots. Recent snapshots are considered later.

Skippy Mapper

The Mapper protocol above that writes mapLog sequentially to the disk may have minimal impact on the snapshot performance because the writing cost may be incurred in the background and because the size of the mappings may be small compared to the size of the snapshot pages.

In contrast, the above Mapper lookup protocol may incur a foreground cost since the application requesting the snapshot is waiting for the lookup to complete. To support efficient BITE that runs application code on a snapshot by transparently paging snapshot pages, the entire snapshot page table for a snapshot may be constructed when application requests a snapshot. To do this, the system may need to find in the mapLog all the mappings for a given snapshot.

Some BITE applications may need to access only a small subset of the pages in a snapshot, so constructing the complete snapshot page table could be wasteful. The benefits of an on-demand Mapper lookup that avoids complete construction are considered below. However, since the order of the page mappings in the mapLog may be determined by the page overwriting order, in the worst case, the lookup of any single page may require as much effort as the construction of the entire snapshot page table. Moreover, the approach described may benefit the on-demand lookup as well. Therefore, without loss of generality, unless specified otherwise, the discussion below assumes that the Mapper lookup constructs the entire snapshot page table.

The construction protocol that reads the mapLog from the disk and scans it collecting the FEMs may have the latency cost of sequential disk i/o proportional to the length of the scan.

The length of the scan may be determined by the length of the "overwrite cycle" of a snapshot v, defined as the transaction history interval starting with the declaration of snapshot v, and ending with the transaction that modifies the last database page that has not been modified since the declaration of snapshot v. Recall, once the overwrite cycle for snapshot v is complete, all database pages corresponding to the snapshot v may be copied into the snapshot store and therefore the mappings for all the pages will be entered into mapLog.

When the page update workload is uniform, most of the mapLog mappings that are read by the scan for snapshot v may be likely to be the first encountered mappings (FEMs). As explained above, finding a FEM for a page P may commence the search for page P, adding a mapping for page P to the snapshot page table under construction, and the scan proceeds quickly. In many storage system workloads, however, the update workload may be "skewed" so that some pages are updated significantly more frequently than others, resulting in an increase in the number of non-FEM mappings encountered during a scan of mapLog.

For example, consider a program that manages a large collection, and allocates on page P a variable to hold the size of the collection. The data in the collection may comprise a large number of pages, and access patterns may be such that repeated modifications to the same page are rare. However, if the size of the collection changes frequently then the workload may be skewed, and if many snapshots are declared, then mappings for page P may appear many times in mapLog, lengthening any scan over mapLog since the mappings are stored sequentially. In file systems, skewed workloads containing "cold" (mutable but very rarely modified) data were reported in studies of log cleaning policies. Similar (albeit anecdotal) evidence has been offered about a commercial snapshot service used by a database workload. There is no definitive long-lived storage system update study that can be pointed to for the evidence, but the general practitioner consensus seems to be that uniform storage system update workloads are the exception rather then the rule, and skewed workloads are much more common.

When update workload is skewed, the lookup scan may slow down because many of the mapLog mappings read by a scan will correspond to repeated modifications of the frequently updated pages and the FEMs for the less frequently updated pages may be encountered infrequently.

For example, even a mild skew, where a third of the database pages are modified by two-thirds of the page updates, doubles the length of the overwrite cycle as compared to a uniform workload, thus doubling the length of the construction scans (see below). Since the application is waiting for the scan to complete, it may be important to reduce the cost of the scan for skewed workloads.

Skippy Structure

In an embodiment of the invention, Skippy is a simple and efficient data structure that accelerates snapshot page table construction for skewed workloads by allowing the construction scan to skip over the unneeded repeated mappings. Skippy may collect the FEMs from the mapLog into higher level logs, omitting the mappings corresponding to frequently modified pages. The logs may be organized into nodes that form a forest. The tree pointers, directed from the nodes in the lower level logs to the nodes in the upper level logs may guide the construction scan from the lower level log containing many repeated mappings to the higher-level "fast lane" logs that contain fewer repeated mappings but still contain all the mappings needed for the construction. Skippy may superficially resemble Skip Lists, a data structure that accelerates search through an in-memory list with pointers that skip multiple elements. Skippy may face a different problem in that it must locate a subset of mappings with membership depending on the start position. Skippy may also have different performance characteristics as an on-disk data structure that exploits redundancy to improve i/o efficiency.

2-Level Skippy

A two-level Skippy forest is herein described and then generalized to a multi-level structure. A Skippy forest may consist of nodes, each holding a certain number of mappings, and links between the nodes. The nodes may be a fixed size capable of holding a certain number of mappings. A node may or may not hold this maximum number of mappings.

Skippy may be constructed on top of a mapLog that is subdivided into successive partitions, called nodes. The level-0 Skippy nodes $n_1^0, n_2^0, \ldots$ may be populated from the successive mapLog partitions. The level-0 nodes may be a separate data structure than the mapLog and may contain copies of the mappings stored in mapLog. Alternately, the mapLog may be partitioned into the level-0 nodes such that a separate data structure is not needed. $n_1^1$, the parent node of $n_1^0$, may be populated by copying into it the FEMs from $n_1^0$, followed by the FEMs from $n_2^0$, and so on, until the parent node is full. The copying may then continue into the next level-1 parent node. Each level-0 node with FEMs copied up to level-1 may have a pointer after the last mapping called "uplink" that points to the next FEM written into its parent node. The level-1 nodes, unlike the level 0 nodes, may not have an uplink. Instead, they may be chained using a pointer called "in-link" that leads to the first mapping in the next node within the same level. This process constructs a two-level Skippy forest.

Figure 2:
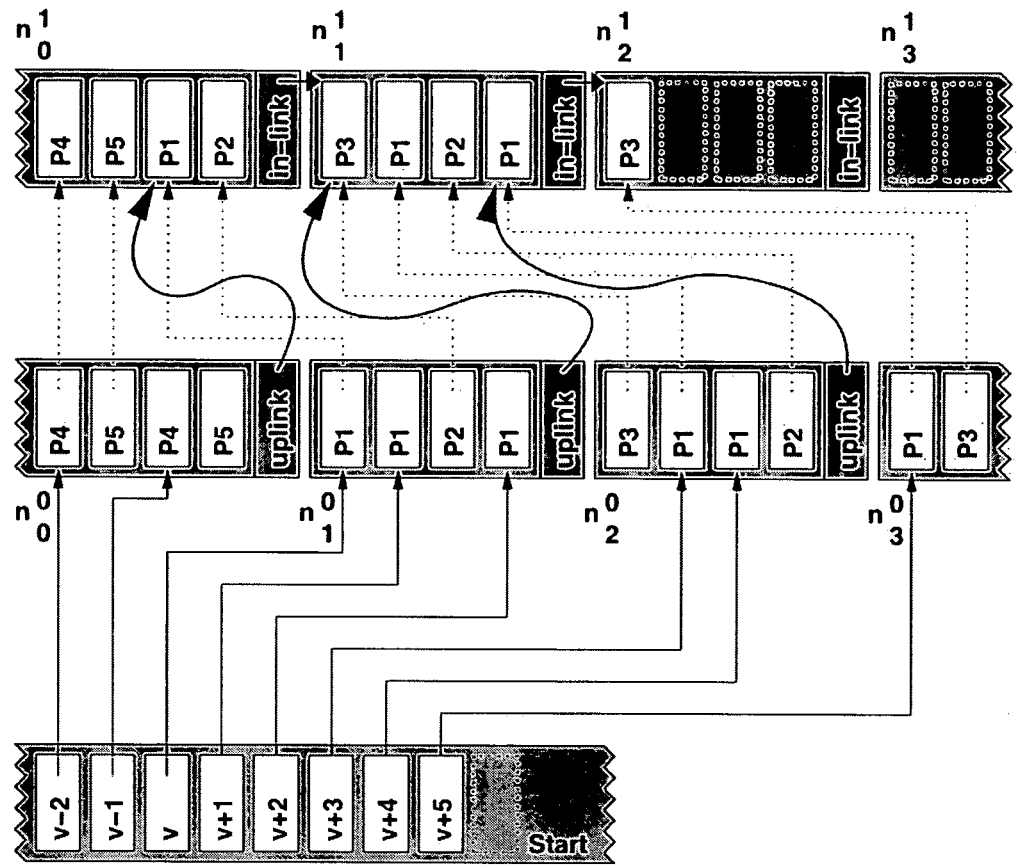
FIG. 2 shows a fragment of a 2-level embodiment of the invention.

FIG. 2 shows an example of an embodiment of a 2-level Skippy construction resulting from executing consecutive transaction history sequences H1, H2, H3. H1 declares snapshots v−2 and v−1, each snapshot has pages P4 and P5 retained for it. H2 is the transaction sequence depicted in FIG. 1, which declares snapshots v (retained P1), v+1 (retained P1 and P2), and v+2 (retained P1 and P3). H3 repeats H2, declaring respectively snapshots v+3, v+4, and v+5. The solid arrows in the figure are pointers to mappings within nodes. The dotted arrows indicate which mappings get copied into a higher level. The node $n_1^0$ contains the FEMs for P4 and P5 copied from $n_0^0$ (setting the uplink from $n_0^0$ to point right after the copied FEMs), and the FEMs for P1 and P2 copied from $n_1^0$ (setting the uplink from node $n_1^0$ to point node $n_1^1$). Notice, in this skewed workload, the level-1 Skippy nodes contain half as many mappings for the frequently modified page P1, compared to the level-0 nodes.

The Skippy scan may reconstruct a snapshot page table by employing a simple map to locate the level-0 Skippy node $n_i^0$ containing start(v), the first mapping recorded by snapshot v, and the location of this mapping within the node. Skippy scan may read in the node $n_i^0$ and collects the FEMs starting from the location identified by start(v) to the end of the node. The scan may then follow the uplink pointer in $n_i^0$, and proceed at the parent node at level 1 to the end of the node and follows the in-link pointers through the successive root nodes to collect the remaining FEMs.

For example, consider an embodiment of a Skippy scan, constructing SPT(v−2) in the example 2-level Skippy shown in FIG. 2 and starting with an empty SPT(v−2) (assuming completed overwrite cycle for v−2) at the node $n_0^0$ containing start(v−2). The scan continues to the end of this node collecting FEMs for P4 and P5, follows the uplink pointer into the parent node $n_0^1$ collecting FEMs for P1 and P2, continues following the in-link pointer to the node $n_1^1$ collecting the FEM for P3, and scans following in-links until SPT(v−2) is filled. Note, the construction of SPT(v−2) avoids scanning three repeated mappings for the frequently modified P1 when using a Skippy scan. This benefit applies to any scan through node $n_1^1$ constructing a page table for a snapshot preceding SPT(v−2).

The Skippy scan constructs correctly the snapshot page table for snapshot v, because, by construction, it collects the same FEMs as would be collected by a scan that proceeds at the level-0 nodes without ever climbing to level-1. Since the level-0 scan collects the same FEMs as the basic mapLog scan, the Skippy scan constructs correctly the snapshot v page table.

Multi-Level Skippy

The 2-level Skippy scan may accelerate snapshot page table construction compared to the basic mapLog scan because it skips repeated mappings that appear within a single level-0 node when it scans at level-1. Nevertheless, a scan that proceeds at level-1 may still encounter repeated mappings that appear in multiple level-0 nodes. In the example in FIG. 2, the scan that constructs SPT(v−2) and proceeds at level-1 encounters in node $n_1^1$ the repeated mappings for P1, copied from $n_2^0$ and $n_3^0$.

To eliminate repetitions over multiple level-0 nodes, the 2-level Skippy described above can be generalized, in a straightforward way, to a multi-level structure.

A multi-level Skippy may be constructed inductively. Given a (h−1)-level Skippy, a h-level Skippy may be constructed by treating the level h−1 nodes as level-0 nodes in the 2-level structure. That is, the level h nodes may be constructed the same way the level-1 nodes are constructed, by copying the FEMs from the level h−1 nodes. The copying may eliminate repetitions among the mappings inside a level h node while retaining the FEMs. Like in the 2-level Skippy, all non-root nodes may contain an uplink pointer pointing to the parent node, and the root nodes (level h) are chained via the in-link pointers.

The scan in the h-level Skippy may start at the level-0 node just like the 2-level scan, and proceed to the end of the node before climbing to the next level. Similarly, after reaching a top-level node, the scan may proceed to follow in-link pointers through the successive root nodes.

The correctness argument for the Skippy scan in the h-level structure is inductive, following the construction and using the 2-level structure as the base case. Namely, by construction, the FEMs collected by a scan after climbing to a level h following an uplink from a level h−1 node, may be identical to the FEMs that would be collected if the scan continued at the level h−1. Since the scan at level h−1 collects the correct FEMs, so does the scan at level h.

The Mapper may write the Skippy forest to disk by writing a separate sequential log for each level. The total Skippy Mapper write cost, therefore, may include the sequential disk i/o cost for the basic mapLog creation, and the additional cost to write mappings into all Skippy levels. It may be important to keep the Mapper write cost low to avoid impacting the storage system. This issue may be especially important for the no-cost garbage collection support in split snapshots because the no-cost generational garbage collection requires creating a separate snapshot page table for each generation, amplifying the cost of writing Skippy forest.

The Skippy scan may perform sequential i/o while reading the mappings in a node and then following an in-link, but performs a disk seek when following an uplink. The cost of a Skippy scan may depend on the number of levels, the size of the nodes, and the workload that produces the mappings. These costs are analyzed below.

On-Demand Mapper

An application running BITE on a snapshot v may need to access only a few pages. Constructing a snapshot page table for the entire snapshot in advance can be wasteful if the database is large and the BITE working set is significantly smaller than the size of the database.

In an embodiment of the invention, a simple modification to the Mapper lookup protocol provides an on-demand variant of the Mapper lookup protocol that avoids the complete in-advance SPT construction at no performance penalty. The on-demand lookup protocol may construct the snapshot page table incrementally. A lookup for page P may collect all the FEMs encountered by the search for mapping for P, inserting the mappings in a snapshot table, and stopping the search once the mapping for P is located. The next lookup request that misses in the partially constructed table may continue the search from the point where the previous scan stopped, collecting on the way further FEMs. The on-demand Mapper may incur no penalty compared to the advance construction even if the BITE eventually accesses the entire snapshot. Of course, as mentioned, the latency benefits for the on-demand Mapper may be workload-dependent, because, even few mappings may require the complete search.

An even more conserving on-demand variant of the lookup protocol, that avoids the construction of the snapshot v page table entirely, searching from start(v) on each request, may be possible. In an embodiment of the invention, such protocol could reduce the memory cost of holding many snapshot page tables in memory when many different snapshots are requested simultaneously.

Importantly, both on-demand variants of the Mapper protocol may benefit from the Skippy acceleration just as the in-advance protocol (possibly more in the more conserving protocol case).

Recent Snapshots

A recent snapshot with an incomplete overwrite cycle may have some of its pages still residing in the database. If a page P for snapshot v resides in the database, the mapLog search may find no FEM for P in snapshot v simply because there is no mapping for P present in the mapLog after start(v).

In an embodiment of the invention, the Mapper avoids unnecessary searches using a simple data structure called lastRetainer that allows it to determine if the page P in the snapshot v is still in the database. lastRetainer keeps for each database page P the number of the most recent snapshot that has the page P retained for it. Thus, the lastRetainer data structure is as large as the number of pages. If lastRetainer (P)<v, no search may be needed because the required snapshot page is in the database.

The protocol is illustrated by considering a specific example that shows how the state of the mapLog and the lastRetainer data-structure at a given point in transaction history relate to the state of the snapshot page tables defined at this point defining the results of the Mapper lookup.

Figure 3:
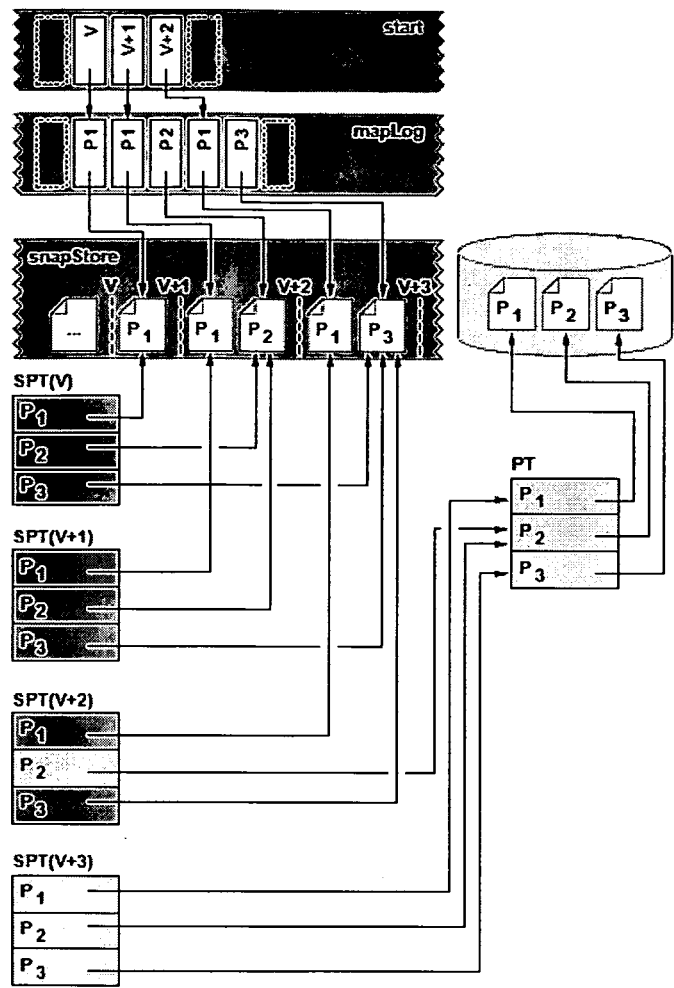
FIG. 3 shows snapshot page tables defined after history S in an embodiment of the invention.

Consider the transaction from FIG. 1, starting with the declaration of a snapshot v, followed by the commit of three transactions, T1 (modifying page P1), T2 (modifying page P1 and P2), and T3 (modifying pages P1 and P3), with each transaction declaring a snapshot. FIG. 3 shows an embodiment of the invention of the state of the mapLog (and the snapStore) resulting from executing S. The figure also shows the corresponding state of the snapshot page tables SPT(v), SPT(v+1), SPT(v+2), and SPT(v+3) defined by the execution of S. These are the snapshot page tables that are constructed by the Mapper lookup if the snapshots declared in S are requested by an application at the point of completion of S. Also shown is the database page table PT, mapping the pages P1, P2 and P3 in the database.

Consider how snapshot page table definitions evolve during S. At the snapshot declaration time, the snapshot pages reside in the database, so initially snapshot page table mappings are defined to point to the database pages. Since no modifications are committed in S following the declaration of snapshot v+3, all mappings in SPT(v+3) in FIG. 3 point to the database.

Transaction T1 commits the first modification to page P1 following the snapshot v declaration. Before this modification updates page P1 on disk, the pre-state of P1 that belongs to snapshot v may be copied into snapStore (the leftmost copy of P1 in snapStore). As a result, the mapping for the copied pre-state of P1 may be written to the mapLog and the mapping for page P1 in the snapshot page table SPT(v) from this point on in the execution is defined to correspond to this mapping. The entry for page P1 in lastRetainer is set to v.

Transaction T2 commits the first modifications to pages P1 and P2 following snapshot v+1 declaration in S. Before P1 and P2 are updated on disk, their pre-states may be copied into snapStore and their mappings are written to mapLog, causing the definition for P1 and P2 in SPT(v+1) to be set to these mappings. The entries for P1 and P2 in lastRetainer are set to v+1.

Note that the pre-state of P2 may also belong to snapshot v. This is because T2 commits the first modification to P2 following the declaration of v so this pre-state corresponds to the state of P2 at the time of the declaration of v. Copying the pre-state of P2, therefore, resets the definition of the mapping of page P2 in both SPT(v) and SPT(v+1). Similarly, the copying of the pre-state of P3 following the declaration of v+2 in S and writing the corresponding mapping into mapLog, resets the definition for P3 in snapshot page tables SPT(v), SPT(v+1), and SPT(v+2). The entries for pages P1 and P3 in lastRetainer get set to v+2. Since no modifications to page P2 are committed following snapshot v+2 in S, the mapping for P2 in SPT(v+2) still points to the database.

Therefore, if an application requests to run BITE on snapshot v+2 at the point of completion of S, the Mapper, using lastRetainer, may construct SPT(v+2) by searching the mapLog for mappings for pages P1 and P3 but not P2, marking P2 as residing in the database. As the result, BITE code accessing pages P1, P2 and P3, may see the correct states of pages P1 and P3 read from the snapStore, and the state of page P2 read from the database.

Across-Time Execution

In addition to running BITE against a single snapshot, an application may be interested in analyzing past states from a sequence of snapshots in a time range. Across-Time Execution (ATE) provides a convenient abstraction for efficiently executing code in a series of snapshots. ATE utilizes the map abstraction to execute code in each snapshot (using BITE), generating a set of results. ATE also allows programmers to provide a reduce callback which iteratively calculates a single result from the set of results returned by mapping BITE over each snapshot. Map/reduce is a common abstraction for list processing, and has also been applied successfully to processing large data sets. The framework for the reduce calculations is outside the scope of this work; we describe here how the map portion of ATE can be made more efficient by exploiting a unique property of Skippy.

Running BITE on consecutive snapshots using Mapper lookup can be wasteful, because the same mappings could be read multiple times. For example, consider the transaction histories depicted in FIG. 2. Running code over each of the snapshots declared by history H2 using Mapper lookup requires executing a separate scan for each of the 3 declared snapshots (v through v+2). The scan for v starts at the first mapping in node $n_1^0$, and collects P1, P2, and P3, ignoring two repeated mappings to P1. The scan for v+1 starts at the second mapping in $n_1^0$, but otherwise follows the same path. The same is true for v+2. The work done by Mapper lookup to scan for v+1 and v+2 is done by the scan for v. The goal is to eliminate this redundant work while still collecting the mappings needed for each snapshot in the range.

Joint Skippy Scan

A single Mapper lookup scan may be insufficient to collect mappings for an arbitrary snapshot range, because mappings needed by a snapshot may not always be copied up to Skippy levels. For example, consider the range from snapshot v+2 to v+4 depicted in FIG. 2. A Skippy scan beginning in node $n_1^0$ will follow the uplink to node $n_1^1$, and will not collect the correct mapping to P1 needed for v+4 (notice that the mapping to P1 pointed to by the start pointer for v+4 is not copied up to node $n_0^1$). The joint Skippy scan solves this problem by first executing a mapLog scan between the mapLog positions pointed to by the start pointers for the first and last snapshots in the range, then executing a regular Skippy scan starting with the last snapshot in the range. For example, if the range is from v to v+5, then nodes $n_1^0$ through $n_3^0$ will be scanned sequentially, ignoring uplinks; then, after the first mapping in v+5 is encountered in $n_3^0$, the Skippy scan will follow uplinks.

The joint Skippy scan can be seen as joining multiple mapLog scans together so that they share the work to collect shared mappings. Because a mapLog scan collects all the FEMs needed by a snapshot, the portion of the joint Skippy scan that only scans mapLog will collect the FEMs written to mapLog within the specified range. Any FEMs missing during this scan will be encountered during a Skippy scan starting with the last snapshot in the range, by the construction of Skippy. Therefore, a joint Skippy scan will collect all FEMs for a range of snapshots in one scan, effectively merging together multiple Mapper lookup scans. The cost of a joint Skippy scan is discussed below.

Performance

This section analyzes Skippy performance analytically and experimentally. The Skippy structure may accelerate the construction scan, decreasing its disk i/o costs at the expense of increased snapshot page table mapping volume, increasing the disk i/o cost of writing the mappings. These Skippy performance benefits and costs may depend on the update workload and Skippy configuration. The analysis seeks to answer the following questions. How much does Skippy accelerate the scan for a given workload, and at what cost? How to select the optimal size of Skippy in practice?

It should be emphasized that, although writing snapshot page table mappings may be a background cost, it is important to minimize it. Techniques for low-cost generational garbage collection of split snapshots may separate the long and short-lived snapshot generations without copying snapshot pages at the cost of creating separate snapshot page tables for each generation of snapshots. Skippy may also have to be replicated, multiplying the impact of Skippy overhead.

In a practical system, application workloads can be irregular, and the impact of the background Skippy creation costs are hard to assess analytically. To address this, the experimental evaluation measures an embodiment of a Skippy prototype using a standard application benchmark, seeking to answer the question, "what is the impact of Skippy in a practical implementation?"

Analysis

A database with a fixed number of pages consisting of two non-overlapping sections (hot and cold) corresponding to frequently and infrequently modified pages is assumed. The cost of recording a snapshot after each transaction is analyzed. Within each section a static, uniformly random, updating workload is assumed. Furthermore, it is assumed that each transaction only modifies one page. Realistic constants from the experimental evaluation described below are chosen to represent hardware and database properties (Table 1) that apply throughout the analysis. In Table 1, $t_{seq}$ refers to the amount of time to read or write one page.

TABLE 1

Constants

| $t_{seq}$ = 0.04 ms | $t_{seek}$ = 8.9 ms |
| page_size = 8 KB | mapping_size = 8 bytes |

The workloads are characterized by the percentage of transactions that execute in the hot section and the percentage of pages are hot. For example, if 80% of the transactions execute in a hot section that comprises 20% of the pages, that workload is called "80/20". Skew is described by greater disparity between these two numbers, i.e., a "99/1" workload may be very skewed (because a small number of pages will be modified many times), while "50/50" may not be skewed at all.

For simplicity, it is assumed that all data in the database is mutable. In practice, the mutable portion of a database is often a relatively small percentage of the total database size (for example, an object representing a person might have mutable fields such as a name, as well as immutable fields such as eye color). Recent database systems such as C-Store, allow for control over the locality of the database layout and so can physically separate the mutable and immutable data. Skippy can leverage these techniques to provide low-cost snapshots of very large databases, provided that the mutable portion is clustered on separate pages from the immutable data.

Overwrite Cycle Size

To determine the overwrite cycle length L for a given workload, the number of transactions (x) may be found that transpire before all pages in the hot and cold sections have been updated at least once. This problem may be equivalent to the well-explored coupon-collector's waiting time problem. In the coupon collector's waiting time, a collector receives coupons of random colors from a fixed set of possible colors, and keeps any coupon of a color they do not yet have, discarding all duplicate coupons. Their "waiting time" is the expected number of coupons that they must receive before they have a complete set. Finding L may be a basic formulation of this problem: all pages, in either the hot or cold section are equally likely to be modified in any one transaction, and each accounts for a single mapping in mapLog when updated. A simplified formulation may be adopted and a generally accepted approximation may be used for the number coupons selected by the time a complete set has been collected, where x is the total number of pages updated (the cycle size) and n is the set of possible pages: $x=n*\ln(n)$.

For the workloads that are constructed, the number of hot pages is never larger than the number of cold pages, and the probability of a transaction executing in the cold section decreases as the size of the cold section increases. By the time all cold pages have been modified at least once, the number of transactions that have executed in the hot section may always be sufficient to have modified all hot pages at least once. Let $x_c$ be the number of transactions that must execute in the cold section to modify each cold page at least once and $p_c$ be the probability of a transaction executing in the cold section. The total number of transactions (in the hot and cold sections) required to modify each cold page at least once is given by $x_c/p_c$. Letting $n_c$ be the number of cold pages, the overwrite cycle is determined to be given by $L=[n_c*\ln(n_c)]/p_c$.

Acceleration

The term "acceleration" is used to indicate the ratio of mappings written into Skippy level h to the number of mappings written into level h−1 over the course of L, indicating the "speedup" achieved by scanning at level h instead of h−1. The number of mappings in an overwrite cycle at any level h is denoted as $N_{mappings}(h)$, determined from the number of FEMs in each node of the previous level. $N_{mappings}(0)=L$ may be the number of mappings in mapLog. The acceleration between level h and the previous level is referred to as $C_{h-1}^{h}$:

$$C_{h-1}^{h}=N_{mappings}(h)/N_{mappings}(h-1) \quad \text{(EQ. 1)}$$

The smaller the ratio, the "faster" a scan at Skippy level h may be, as compared to a scan at h−1. The number of mappings in level h may be bound above by the number of mappings in h−1; if all mappings at level h−1 are unique (imagine an updating query that makes exactly one change in each page of the database), then no mappings may be redundant and they may all be written into the n level as well (snapshot page tables for this workload are constructed optimally by scanning mapLog alone). The number of mappings in level h may be bounded below by the number of segments in level h−1, since by definition the first mapping written into any segment is not redundant. Thus, given that 1 is the node size, the bounds on acceleration from h−1 to h may be $1/l \le C_{h-1}^{h} \le 1$.

FEMs in a Node

In order to determine how many FEMs there will be in any given node at level-0 (the mapLog), $N_{fem}(l)$, the expected number of pages out of the set of all pages in the database that will be unmodified after x transactions ($EN_u(x)$) may first need to be determined, where x is the number of transactions that execute while one mapLog node is being filled with mappings. Like the solution to overwrite cycle size, this problem may be closely related to the coupon-collector problem. The number of unmodified pages out of a set of n pages after x transactions where the probability of selecting a page is $1/n$ is: $EN_u(x)=n*(1-1/n)^x$.

Because a node has a fixed length l, and in the analysis the number of mappings created during a transaction is fixed (to 1), the number of transactions that execute in a node may also be fixed. To find $N_{fem}(l)$, the number of pages not modified after the number of transactions that contribute mappings to that node have committed may be subtracted from the total number of pages. Transactions in the hot and cold sections of the database do not overlap, so the number of unique mappings in each section ($n_h$ and $n_c$) may be calculated separately. It is assumed that the ratio of hot transactions to cold transactions is the same in a node as it is over the cycle.

$$N_{fem}(0)=(n_h-EN_u(l^*p_h))+(n_c-EN_u(l^*p_c)) \quad\quad (EQ.\ 2)$$

Expected Acceleration Ratio

The acceleration between the mapLog (h=0) and the first Skippy level (h=1) may be found by substituting Equation 2 into Equation 1 and the number of mappings in a node, l: $C_{n-1}{}^n = N_{fem}(l)/l$.

To find the acceleration between successive Skippy levels, acceleration may be a recurrence relation, since $C_{n-2}{}^{n-1}$ impacts $N_{fem}$ in a node at level n-1, which in turn impacts $C_{n-1}{}^n$. The base case for the recurrence relation is $C_{-1}{}^0$, which is simply 1 (i.e., there is no acceleration with from the mapLog to itself). Keeping in mind that each Skippy level has the same structure as the base mapLog, it is found that acceleration for each level may be determined using this recurrence relation:

$$C_{n-1}{}^n = N_{fem}(l/C_{n-2}{}^{n-1})/l \text{ for } n\geq 1 \quad\quad (EQ.\ 3)$$

Acceleration Behavior

Acceleration will always be in the range (0,1]. Lower acceleration ratios may indicate better reduction in the number of mappings between two successive levels. Acceleration may be harmonic, with the oscillations dampening as the number of Skippy levels (h) increases. This behavior may be due to the fact that relative acceleration is dependent on how many mappings were eliminated at the previous level, so that high relative acceleration is followed by low relative acceleration. The stable acceleration value as h gets larger may not indicate that redundant mappings are no longer being eliminated; rather, it indicates that a relatively constant number of redundant mappings are being eliminated between each pair of successive levels.

"Total acceleration" is simply the result of multiplying each successive acceleration factor up to the top-most Skippy level, giving the total acceleration between a node at the top level and a node at the bottom (0th) level: $C_0{}^h = \Pi_{i=0}{}^h C_{i-1}{}^i$. Total acceleration will be 1 for a single mapLog, then decrease as Skippy levels are added.

Maximum and Optimum Skippy Height

When the workload is skewed, construction scans over mapLog become impractical (because $x \gg N_{fem}$). Adding Skippy levels may reduce the length of the scan that produces the same set of FEMs. The maximum Skippy height ($h_{max}$) is defined for a given workload as equal to the number of levels that can be written into if only one node is used at each level. In other words, $h_{max}$ is the maximum number of levels that can be written in order for the construction process to always climb after reading a node, until there are no more mappings remaining in the overwrite cycle. If the height h of Skippy is less than $h_{max}$, then there may be leftover mappings remaining at the top-most level that will require scanning forwards through more than one node before all the mappings in the overwrite cycle have been read.

To find $h_{max}$, an iterative algorithm may be used that uses total acceleration at each Skippy level to calculate how many mappings have been skipped when reading in one node at each level, terminating the algorithm when the number of mappings read at each level plus the number of mappings skipped over at each level sums to the total number of mappings in the overwrite cycle.

Figure 4A:
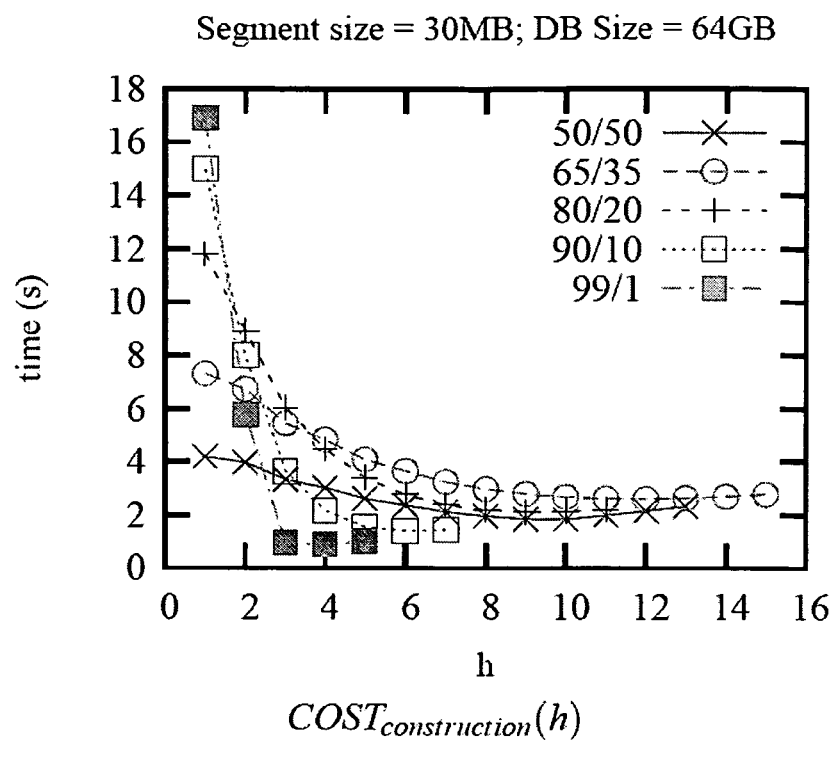
FIG. 4A shows a line graph and FIG. 4B shows a bar graph of construction times for various workloads in an embodiment of the invention.
Figure 4B:
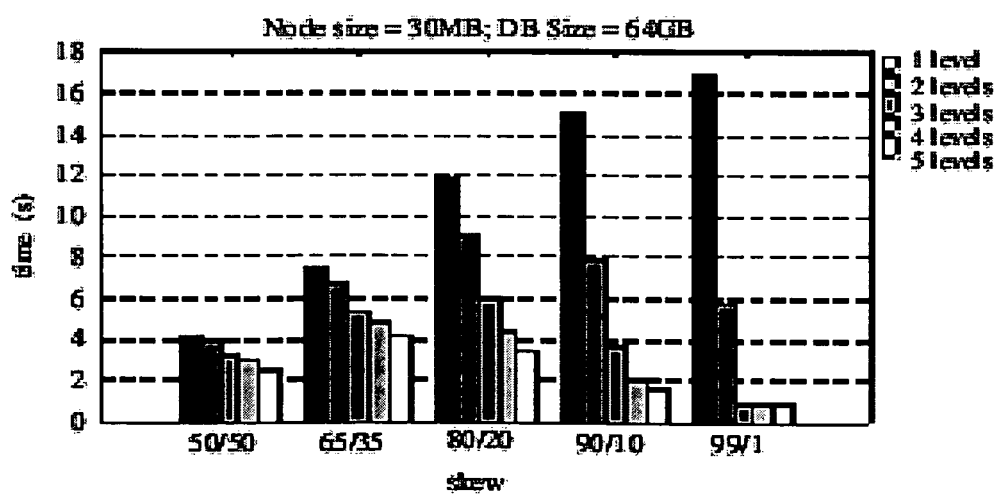

Interestingly, a Skippy of height $h_{max}$ may not be optimal in terms of construction cost. Because seeking on disk may be an order of magnitude more expensive than sequential i/o, minimum construction costs may be found at a Skippy of some optimum height $h_{opt}$ which is the largest height h meeting the following criteria: the sequential i/o cost eliminated due to acceleration at h is larger than the cost of a seek to travel from level h-1 to h. Once construction has reached $h_{opt}$, it may be most cost-effective in terms of i/o to scan leftover mappings at $h_{opt}$ instead of reading only one node then traveling up to the next Skippy level. $h_{opt}$ is found by calculating the construction cost (see Equation 6) at each height up to $h_{max}$ and then taking $h_{opt}$ to be the h that corresponds to the minimum value in the set of results. FIGS. 4A and 4B show the construction time in an embodiment of Skippy versus h up to the maximum h, demonstrating how the optimum h (the trough in the curve) is found at some $h_{opt} < h_{max}$. Columns 2 and 3 of Table 2 show $h_{max}$ and $h_{opt}$ calculated for various workloads.

TABLE 2

Maximum and Optimum h, and Practical h (5 second construction time) for Various Workloads

| Workload | $h_{max}$ | $h_{optimum}$ | $h_{practical}$ |
|---|---|---|---|
| 50/50 | 13 | 10 | 1 |
| 65/35 | 15 | 12 | 4 |
| 80/20 | 11 | 9 | 4 |
| 90/10 | 7 | 6 | 3 |
| 99/1 | 5 | 4 | 2 |

Construction Cost

The construction cost with only a mapLog may be the cost of sequentially reading all the mappings in one overwrite cycle plus one seek operation to position the read at the correct starting location in mapLog. This is referred to as the base construction cost:

$$COST_{construction}^{Base} = t_{seek} + \frac{N_{mappings} * m * \text{mapping\_size} * t_{seq}}{\text{page\_size}} \quad\quad (EQ.4)$$

The number of leftover mappings in the overwrite cycle for a Skippy of height h is given by:

$$\text{leftovers} = C_0^h * \left( N_{mappings} - \sum_{i=0}^{h} \frac{l}{C_0^i} \right) \quad\quad (EQ.5)$$

The cost of construction with h Skippy levels given that $h \leq h_{max}$ is:

$$COST_{construction} = t_{seek} * h + \frac{\left( \sum_{i=0}^{h} (l) + \text{leftovers} \right) * \text{mapping\_size} * t_{seq}}{\text{page\_size}} \quad\quad (EQ.6)$$

Benefit

Figure 5A:
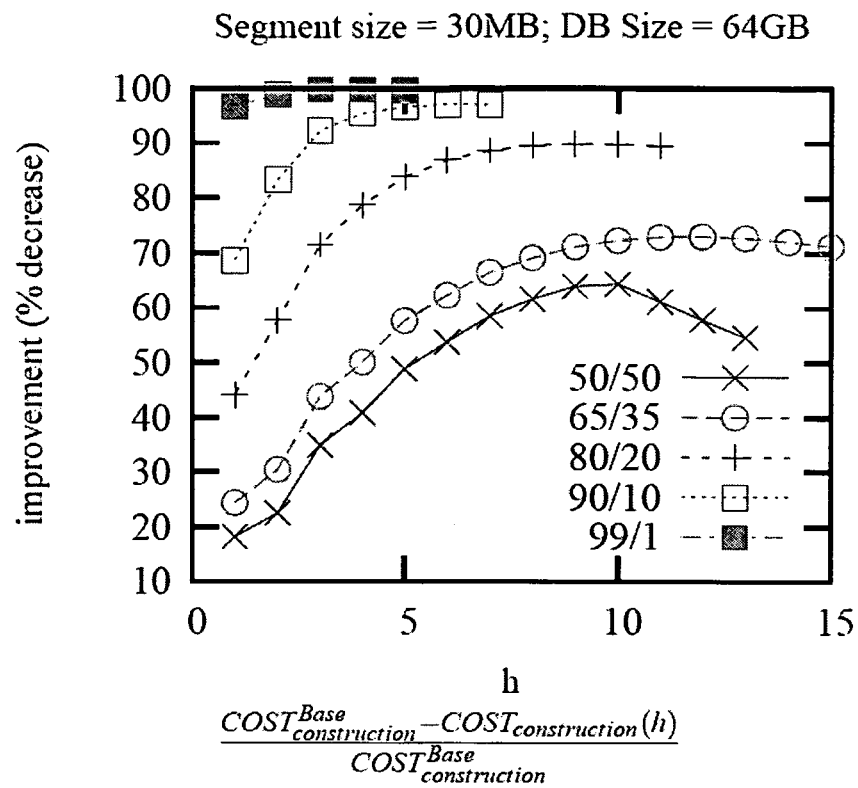
FIG. 5A shows a line graph of construction benefit for various workloads and FIG. 5B shows a bar graph of the construction benefit for the "90/10" workload across multiple database sizes and Skippy levels in an embodiment of the invention.
Figure 5B:
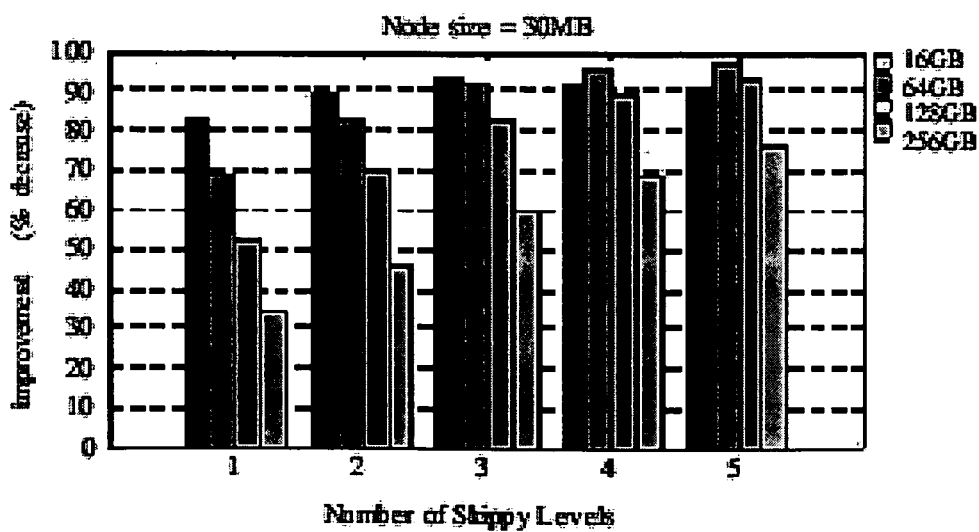

Construction times decrease at a decreasing rate as the height of Skippy increases up to $h_{opt}$ (FIGS. 4A and 4B). The optimized costs are about the same for each workload, with the cost increasing as h increases from $h_{opt}$ to $h_{max}$. FIGS. 5A and 5B show the decrease in overall construction cost in an embodiment of Skippy as a percentage of the baseline cost (Equation 4) in terms of Skippy height. A high percentage indicates a large decrease as compared to the baseline.

The benefit of employing Skippy may be more pronounced for highly-skewed workload than for less-skewed workloads. Highly skewed workloads may have many more redundancies within a node and have many more mappings in a overwrite cycle, and so show a much greater reduction in the number of mappings scanned when using Skippy as compared to just mapLog. This leads to, perhaps, the surprising conclusion that highly skewed workloads may require fewer Skippy levels than less skewed workloads to achieve the same relative improvement in construction performance.

Increasing the node size may increase the number of redundancies that can be eliminated in a node, but this benefit may be slightly outweighed during construction by the cost of scanning more mappings at less efficient levels before being able to seek to higher, more efficient levels. Smaller node sizes may allow the construction process to more quickly reach the optimum scanning level, thus decreasing overall construction costs.

Figure 6:
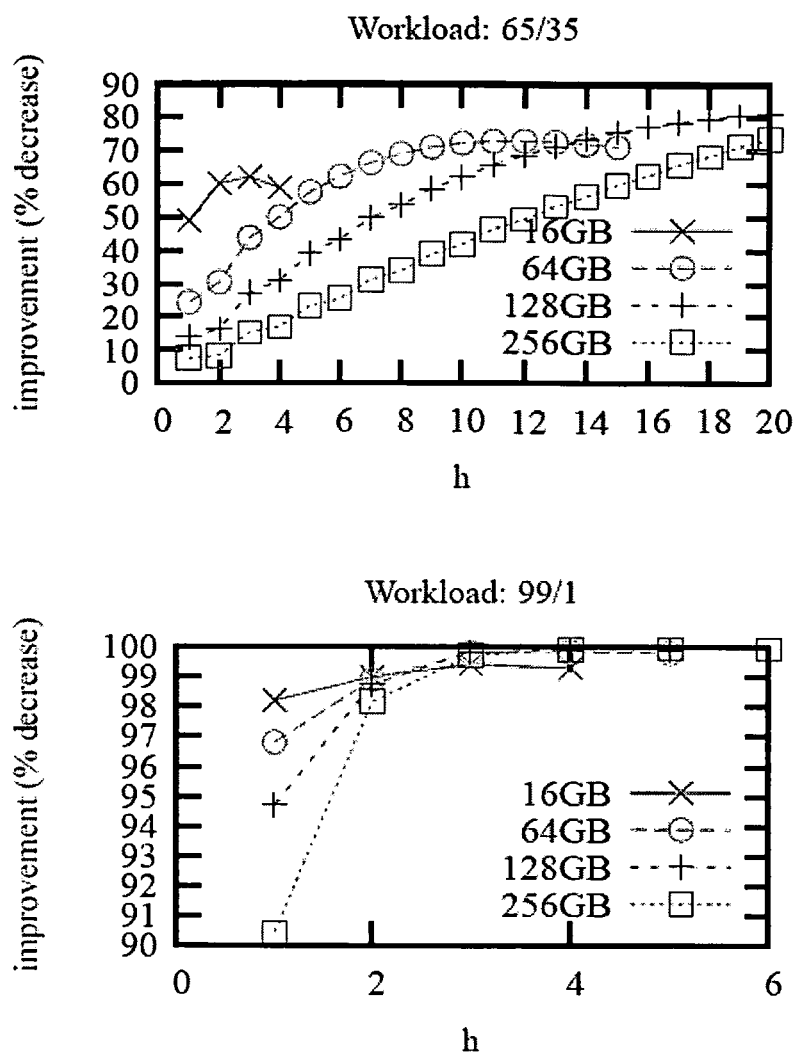
FIG. 6 shows a graph of construction benefit for various workloads and database sizes in an embodiment of the invention.

In order to maintain optimum construction performance as the size of the database increases, either the segment size or the number of Skippy levels must increase. FIG. 6 shows how the $h_{opt}$ increases as the size of the database increases for two workloads in an embodiment of Skippy. For highly skewed workloads, the difference in $h_{opt}$ between different database sizes is may not be very pronounced, whereas for the less-skewed workloads, there may be a substantial increase in $h_{opt}$. This indicates that Skippy scales well for highly skewed workloads without reconfiguring the number of Skippy levels.

Cost of Joint Skippy Scan

We know by invariant $I_{mapLog}$ that the mappings written into mapLog between the start position of v and the start position of v+1 are FEMs for v, and so on for each pair of subsequent snapshots in an arbitrary range of snapshots. Thus we have corrolary $C_{mapLog}$: all mappings in mapLog between the start position of v and the start position of v+k are FEMs for one or more of the snapshots in the range v through v+k−1.

Because all mappings scanned during the mapLog phase of the joint Skippy scan are FEMs, there is no wasted work during this phase. Because all i/o when scanning mapLog is sequential, this phase has minimal i/o cost. Thus, by corollary $C_{mapLog}$, the cost of the joint Skippy scan is the minimal cost to read all FEMs recorded between the declaration of the first and last snapshots in the range, plus the cost of a single Skippy scan to find the FEMs for the last snapshot in the range.

Creation Cost

The cost of writing mappings into the mapLog is the minimal possible creation cost for the algorithm, since appending mappings into a sequential log is i/o minimal. The baseline cost, distributed over an entire overwrite cycle, is:

$$COST_{creation}^{Base} = \frac{N_{mappings} * \text{mapping\_size} * t_{seq}}{\text{page\_size}} \quad (EQ.7)$$

The cost of creating Skippy is calculated using the number of mappings that are written into each level in a Skippy of height h during an overwrite cycle.

$$COST_{creation}(h) = \sum_{i=0}^{h} \left( \frac{N_{mappings} * C_i^0 * \text{mapping\_size} * t_{seq}}{\text{page\_size}} \right) \quad (EQ.8)$$

Overhead

Figure 7A:
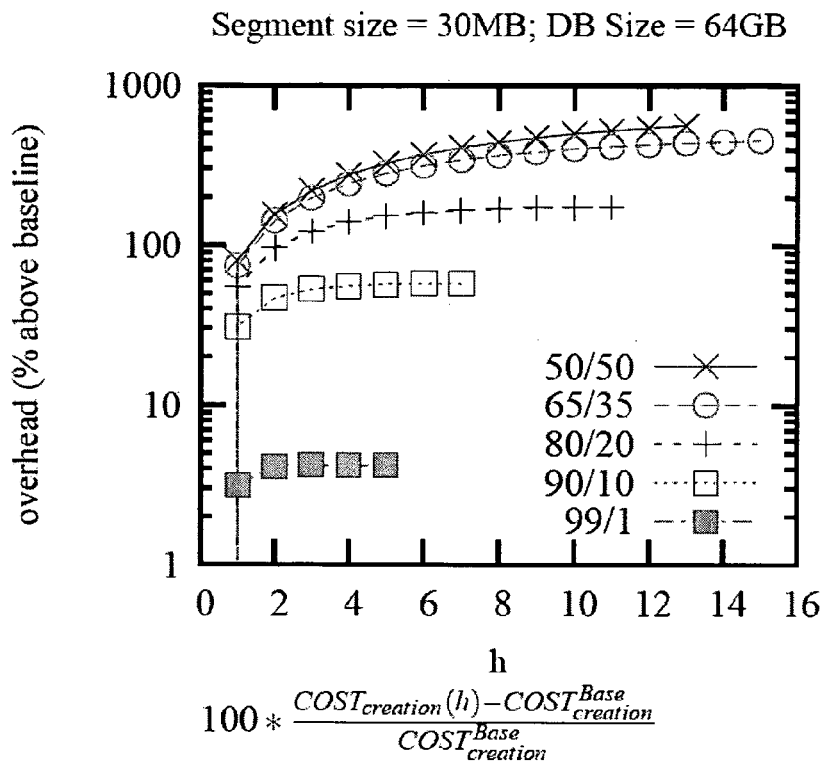
FIG. 7A shows a line graph and FIG. 7B shows a bar graph of creation overhead for various workloads in an embodiment of the invention.
Figure 7B:
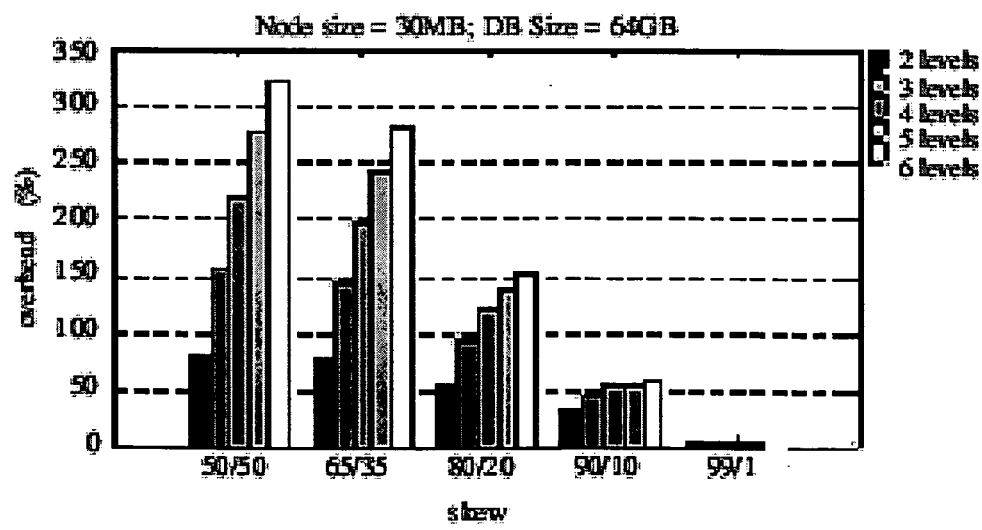

Creation costs may increase as the workload becomes more skewed and when database size increases (because in both cases L lengthens). An embodiment of Skippy imposes little overhead in highly skewed workloads as a percentage of the baseline cost of creating mapLog (FIGS. 7A and 7B).

Increasing the node size also may have the effect of decreasing $h_{opt}$ for a given workload, although it also slightly decreases construction performance. Larger node sizes may lessen the impact of increasing database size because $h_{opt}$ is smaller at larger segment sizes. This indicates that segment size may provide a tool to balance creation cost with construction performance for a given database size.

Memory Costs

Memory costs may be a limiting factor on achieving optimal construction performance. One node at each Skippy level may need to be resident in memory during creation, so the height of Skippy may be limited by the amount of physical memory available. Since increasing node size may decrease construction performance as well as increase the memory footprint, a good rule of thumb when configuring Skippy may be to use a smaller node size (e.g. 15 MB) unless creation costs are disruptive to current database activity, at which point node size should be increased enough to lessen Skippy's impact on the database. If physical memory will not allow node size to be increased, but the height of Skippy must still be decreased due to creation cost, then construction performance might suffer.

Practical Skippy Height

Creation overhead and memory requirements may both increase with each additional Skippy level, while construction benefits may be most pronounced in the first few Skippy levels. A practical way to determine the height of Skippy may be to determine an acceptable time to reconstruct SPT(v), then use the smallest height that will enable construction in that time for a given workload and database size, which is termed $h_{practical}$. Column 3 of Table 2 shows $h_{practical}$ corresponding to construction times of 5 seconds or less for a 64 GB database.

$h_{practical}$ supports the intuition that the most benefit from Skippy is found in the first few levels. As can be seen from FIGS. 4A and 4B and Table 2, the difference in real construction time between $h_{practical}$ and $h_{opt}$ is small, indicating a case of diminishing returns to optimize construction. For some workloads, it is practical to use only mapLog with no Skippy levels. Skippy is designed to shorten construction scans for highly skewed workloads; analysis indicates that it succeeds at dramatically increasing performance for highly skewed workloads even at a sub-optimal (but practical) height.

Importantly, in practice, the beneficial Skippy configuration height may be determined simply by tracking acceleration between levels at creation time. If the acceleration is low, the upper level is not written, and lower level uplink pointers revert to in-link pointers.

Examples

The Skippy Mapper has been implemented in the SNAP split snapshot system. Skippy was grafted onto the original SNAP system that archives snapshot page mappings in the mapLog and constructs snapshot page tables using a sequential scan. The original system accelerates scans by retaining in-memory checkpoints for selected snapshots, only benefiting recent snapshots. The Skippy-based system retains the Mapper components that maintain the correct writing order for the mappings, to satisfy invariant $I_{mapLog}$, support fast in-memory construction for very recent snapshots, and coordinate between the construction process and page copying process to support snapshot page table updates during construction for snapshots with incomplete overwrite cycles.

The prototype was used to conduct an experiment to gauge the impact of Skippy in a running system. The analysis above evaluated the overhead of Skippy in terms of the total extra snapshot page table mapping disk i/o required for Skippy creation in an overwrite cycle. In a running storage system, Skippy is created incrementally, in the background, as part of the copy-on-write snapshot creation process that accompanies the database update process, and as such, could slow down the update process, ultimately impacting the foreground application transactions. A useful practical measure of Skippy efficiency is the impact of its background creation cost on the update process. The experiment gauges the overhead of Skippy on the update process in the prototype system by measuring and comparing the cost of updating a single database page in a system with and without snapshots, and breaking down the overhead due to snapshots into two components, the overhead due to the copying of snapshot pages, and the overhead due to the writing of snapshot page table mappings. How the overhead with Skippy compares to the overhead of a system without it was then considered.

The experiment runs in a client/server system with the Skippy-enhanced SNAP system running at the server. The client generates an application transaction workload by running a variant of the OO7 benchmark read/write traversals T2a declaring a snapshot after each transaction (highest frequency). The application-level benchmark does not allow controlling the page-level update skew directly, typical for an application written in a high-level language. Instead, the benchmark updates randomly selected objects. The resulting workload has a complex page-level behavior but exhibits the following observed page update characteristics. It generates high overwriting, and the randomly-selected object updates leave some pages unmodified for a long time, producing a highly skewed workload (long overwriting cycle), and also stressing the total archiving system overhead.

The experimental setup is not further detailed for brevity and because the conclusions are mostly independent of it, noting instead, that an identically configured experiment in SNAP using in-memory acceleration has shown that even for high-frequency snapshots, the entire split snapshot overhead is low and the cost of writing the snapshot page table mappings is minimal. The experiment confirms the findings for the Skippy-based system (that accelerates lookup at the cost of extra writing of snapshot page table mappings). A Skippy graft configured for h=2 with Skippy node size set to 512 KB contributes 1.3% of the total archiving overhead, out of which 0.3% is due to the additional Skippy levels, with the remainder due to the base housekeeping costs in the entire Mapper subsystem. Based on the measurement and analysis, it is therefore conservatively estimated that in practice the cost of writing snapshot page table mappings in the few additional levels required to achieve the, close to optimal, predicted Skippy benefit will remain small.

The snapStore created by the workload was used (16K snapshots, 60 GB snapStore) to run Skippy scans on snapshots with completed overwrite cycles, representing long-lived snapshots that can not take advantage of in-memory meta-data acceleration. The measured Skippy scan costs for reading and scanning a Skippy node were 55 ms. Given the workload, compared to a SNAP system without lookup acceleration, the h=2 level Skippy reduces 19-fold the construction scan length. The results indicate the predicted performance benefits of even small Skippy structure in skewed workloads.

Conserving Skippy in Berkeley DB

In order to support analytical results with the conserving Mapper lookup protocol under a deterministic workload, and to gain experience implementing Skippy in a database storage manager, SkippyBDB was implemented, a split-snapshot system built inside Berkeley DB (BDB). SkippyBDB augments the BDB page cache, storing pre-states of pages into snapStore and implementing the Mapper creation algorithm. Applications requesting BITE use an unmodified BDB interface for accessing records; the SkippyBDB-enhanced page cache transparently loads snapshot pages from snapStore.

SkippyBDB was used to measure the performance of the conserving Mapper lookup protocol. Unlike the OO7 benchmark used to benchmark the SNAP-based system, the workload used to measure SkippyBDB exploits the calculable layout of BDB records, allowing the benchmark to specify the workload at the page level. The experiment exploits this control to produce a regular mapping distribution that allows the expected acceleration from Skippy levels to be calculated, which is then confirmed by measurements of SkippyBDB conserving lookup performance.

Experimental Setup

The SkippyBDB benchmark initializes the database by inserting a number of fixed size records, generating a deterministic page layout. Next, a modification loop is executed that, during each iteration, declares a snapshot and then modifies all but the last page in the database. Because the last page is unmodified, each iteration extends the overwrite cycle of each snapshot. Finally, the last page is modified, completing all overwrite cycles.

The workload generates a B-tree database containing 254 pages, comprised of 249 leaf pages. Each iteration of the modification loop causes mappings for all leaf pages to be stored into Mapper. Skippy nodes were configured to hold 500 mappings (from which a factor of 2 acceleration is expected because half of the mappings in each node are redundant). This loop is run for 2000 iterations, generating a mapLog of 9 MB. Each Skippy level is roughly half the size of the previous level. The experiment is small scale because the Mapper creation time was a limiting factor, but it is expected to have large database results for the final version.

The experiment requests BITE on the oldest snapshot in Mapper and then asks BDB for a record that the bench-mark placed on the last page in the database. The time that it takes Mapper lookup to find the mapping for this page (which requires scanning the entire overwrite cycle) is measured. The experiment runs on a PowerMac G4 with dual 1 GHz processors and 1.5 GB of SDRAM running Macintosh OS X 10.4. The database and snapStore were both located on a Seagate Barracuda ATA/100 7200 RPM hard drive formatted with journaled HFS+. BDB defaulted to 4K as its preferred pages size on the OS X platform, giving a database size of 1016 K.

Results

Table 3 shows the results of this experiment. A height of 0 corresponds to Mapper lookup using only mapLog. The lookup times were determined by averaging the results of 5 experimental runs at each height (with minimal variance). These results confirm the expected behavior of the lookup protocol given the synthetic workload by measuring a decrease between levels of lookup time by close to a factor of 2.

TABLE 3

| SkippyBDB Performance | |
|---|---|
| Height | Lookup Time (seconds) |
| 0 | 1.85 |
| 1 | 0.93 |
| 2 | 0.46 |
| 3 | 0.24 |
| 4 | 0.12 |

Although the search times do not appear large on their face, if a conserving Mapper is used in order to reduce memory consumption, then this cost will be incurred per page miss in the cache, which could add up to a substantial cost in paging latency. It is also expected that this performance benefit will scale, as the analysis above shows that Skippy acceleration is independent of database size and history length.

What is claimed is:

1. A method for locating a needed snapshot page mapping of a snapshot, comprising:
   a) locating a first snapshot mapping retained for a snapshot within a partition of a first level of a plurality of partitioned levels, wherein said levels are adapted for storing snapshot mappings of said snapshot, and wherein said snapshot mappings are stored when a page of said snapshot is copied from a database storage to a snapshot storage, and wherein at least one of said snapshot mappings is a first snapshot mapping retained for said snapshot, and wherein partitions of said first level are populated by said snapshot mappings, and wherein partitions of a subsequent level are populated by copies of said at least one first snapshot mapping from partitions of a previous level, and wherein a last mapping of a partition is linked to a first mapping of a subsequent partition of the same level, and, additionally, wherein said last mapping of a partition not of said last level is linked to a mapping in said subsequent level which immediately follows the last of said copies of said first mappings of said partition not of said last level;
   b) setting a current snapshot mapping to said first snapshot mapping retained for a snapshot;
   c) setting a current snapshot mapping to the next snapshot mapping in a current partition if said current snapshot mapping is not the needed snapshot page mapping and said current snapshot mapping is not the last snapshot mapping of said current partition;
   d) repeating step (c) until said current snapshot mapping is a last snapshot mapping of said current partition, if said current snapshot mapping is not the said needed snapshot page mapping;
   e) setting said current snapshot mapping to a snapshot mapping linked to in said subsequent level by said last snapshot mapping if said current snapshot mapping is said last snapshot mapping of a partition and said snapshot mapping is in a partition not of said last level;
   f) setting said current snapshot mapping to a snapshot mapping linked to in said last level by said last snapshot mapping if said current snapshot mapping is the last snapshot mapping of a partition and the snapshot mapping is in a partition of said last level;
   g) setting said current partition to a partition containing said current snapshot mapping linked to by said last snapshot mapping;
   h) repeating steps (c)-(g) until the needed snapshot page mapping is located;
   obtaining a plurality of said needed snapshot mappings for a plurality of said snapshots in a range by repeating steps (a)-(h) for each of said plurality of said snapshots; and
   obtaining a plurality of said snapshot mappings for said plurality of said snapshots in a range, by repeating steps (a)-(h) wherein in step (e) said first level is treated as said last level between the first mapping retained for the first snapshot in said snapshot range and the first mapping retained for the last snapshot in said snapshot range, then repeating steps (a)-(h), starting with the first mapping retained for the last snapshot of said snapshot range.

2. The method of claim 1, wherein step (a) includes placing said first mapping retained for the first snapshot in the snapshot range in a page table of said first snapshot, and wherein step (c) includes placing said current mapping in a page table of each of said snapshots in said range for which said current mapping is a first encountered mapping.

3. The method of claim 1, wherein the method is performed in a single scan such that all said mappings are read exactly once.

4. The method of claim 1, wherein step (a) includes placing said first mapping retained for the snapshot in a page table of the snapshot, and wherein step (c) includes placing said current mapping in said page table if said mapping is a first encountered mapping in said snapshot.

5. The method of claim 4, further comprising:
   h) determining all pages of the snapshot located in said database storage using a second table for determining if said page of said snapshot is located in said snapshot storage or in said database; and
   i) placing all of said mappings of the snapshot located in said database storage in said page table.

6. The method of claim 1, wherein said plurality of said snapshots are arranged chronologically.

7. The method of claim 1, wherein said plurality of said snapshots are arranged sequentially.

* * * * *